UNITED STATES PATENT OFFICE.

JOHN MURPHY, OF NEW YORK, N. Y.

IMPROVEMENT IN THE MANUFACTURE OF VULCANIZED RUBBER AND COMBINATION HOSE AND TUBING.

Specification forming part of Letters Patent No. 117,447, dated July 25, 1871.

*To all whom it may concern:*

Be it known that I, JOHN MURPHY, of the city, county, and State of New York, have made a new and useful Improvement in the Manufacture of Vulcanized Rubber and Combination Hose and Tubing; and I hereby declare the following to be a full and exact description of the same.

Heretofore vulcanized hose and tubing has been made by winding the fabric, properly coated with a vulcanizable compound, upon a mandrel and placing it in the heater. The hose thus produced is liable to be defective, for the reason that any air inclosed or gas generated during the vulcanizing expands and separates adjoining plies of the fabric so as to produce flaws in the hose. The surface of the hose is also more or less rough, and sometimes is blistered from gases escaping.

My invention consists in inclosing the hose or tubing, while in the heater, in a strong mold, which keeps the surface smooth and prevents any separation of the fabric. The hose thus produced is more solid and compact. Its surface is smooth and free from blister and fissures or flaws throughout.

The following description will enable any one to make and use my invention:

I prepare the hose and tubing ready for vulcanizing by any suitable means. This, being well understood by manufacturers, need not be particularly described. The hose thus prepared is then inclosed in a mold or sheath which can be opened, and the whole placed in the heater and vulcanized in the usual manner. The mold should be slightly longer than the hose, as it expands to some extent while in the heater, the degree of expansion depending upon the size and thickness of the hose. The mold should be so constructed as to be opened after the operation is completed, so as to remove the article, and may be in two or more pieces hinged together or united by clamps, bands, or other suitable device. The mold may be made of cast-iron, wrought-iron, brass, or other suitable metal. If thin sheet metal is used it should be properly strengthened by bands or clamps. A great variety of forms of molds may be used so as to carry out the principle of my invention.

The hose and tubing produced is readily distinguished from that made heretofore by its smooth surface.

Having thus described my invention, what I claim, and desire to secure by Letters Patent of the United States, is—

1. The improved method herein described of manufacturing vulcanized hose and tubing, the same consisting in inclosing it in a mold while subjected to the heat for vulcanizing.

2. The improved smooth-finish hose and tubing, produced by confining it in a mold and vulcanizing, substantially as set forth.

JOHN MURPHY.

Witnesses:
A. C. BENEDICT, Jr.,
M. HAWE, Jr.